United States Patent

Stoffel

[15] 3,679,152
[45] July 25, 1972

[54] CONTROLLED INERTIA SHOULDER STRAP RETRACTING DEVICE

[72] Inventor: Robert W. Stoffel, Ferndale, Mich.

[73] Assignee: Allied Chemical Corporation, New York, N.Y.

[22] Filed: Oct. 8, 1970

[21] Appl. No.: 79,098

[52] U.S. Cl.....................242/107.4, 297/389, 280/150 SB
[51] Int. Cl. .........................................................A62b 35/00
[58] Field of Search...........242/107 R, 107 SB, 107.3, 107.4, 242/107.5, 107.6; 297/386, 388; 280/150 SB

[56] References Cited

UNITED STATES PATENTS

| | | |
|---|---|---|
| 3,526,431 | 9/1970 | Boedigheimer et al.........242/107.4 X |
| 3,431,019 | 3/1969 | Lewis et al..........................297/388 X |
| 3,467,337 | 9/1969 | Putman...............................242/107.4 |
| 3,491,966 | 1/1970 | Curran et al........................242/107.4 |
| 3,504,867 | 4/1970 | Stevenson.......................242/107.4 X |
| 3,545,788 | 12/1970 | Pringle..................................280/150 |
| 3,551,002 | 12/1970 | Dozois..................................280/150 |

Primary Examiner—Werner H. Schroeder
Attorney—Jonathan Plaut

[57] ABSTRACT

A motor vehicle shoulder strap retracting device for use with an inertia responsive belt element locking device. The retracting device relieves the vehicle occupant of the continuous retracting force heretofore applied by the shoulder strap to the occupant.

12 Claims, 3 Drawing Figures

PATENTED JUL 25 1972
3,679,152
INVENTORS:
ROBERT W. STOFFEL
BY
Jonathan Plaut
ATTORNEY
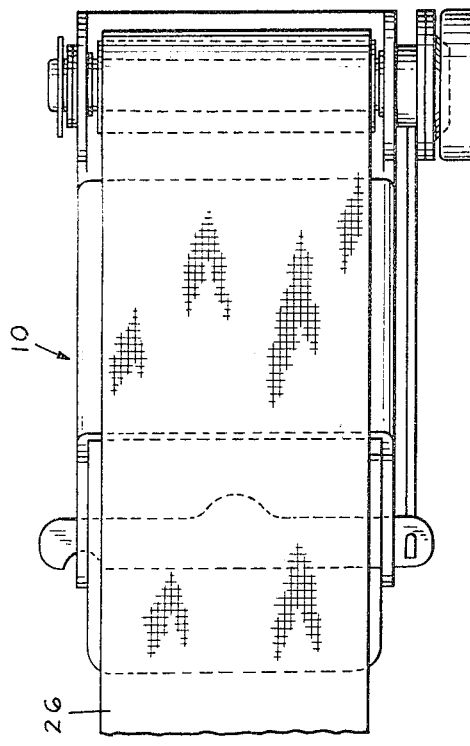
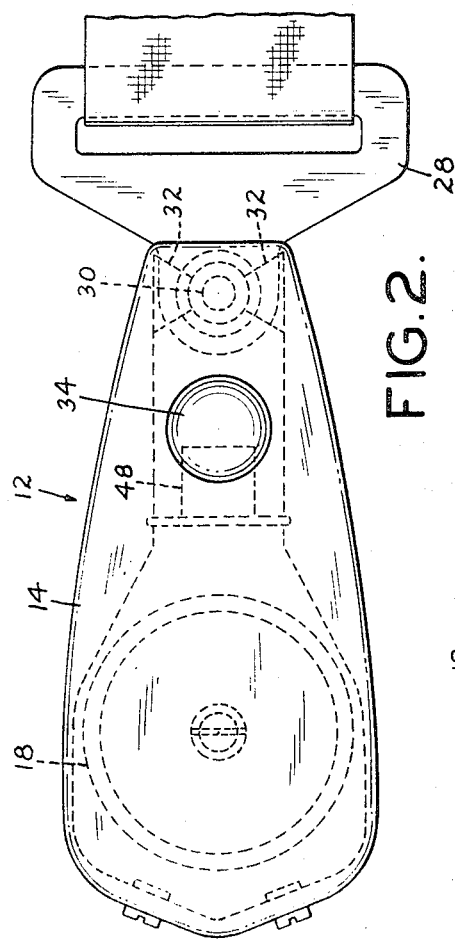
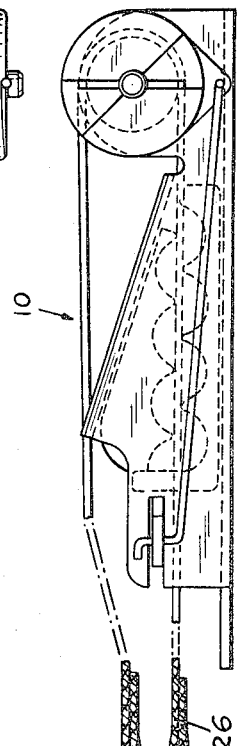
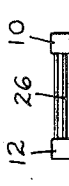

CONTROLLED INERTIA SHOULDER STRAP RETRACTING DEVICE

BACKGROUND OF THE INVENTION

1. Field of the Invention

This invention relates to a motor vehicle shoulder strap retracting device which eliminates the continuous retracting force heretofore applied to the occupant of a vehicle by retractors which continuously bias the shoulder strap toward retraction during normal vehicle operation. The retracting device also facilitates convenient shoulder strap length adjustments.

2. Description of the Prior Art

With the advent of shoulder straps as an important safety aid in combination with lap belts, various pieces of hardware have been designed for hanging up the straps within the vehicle body when not in use. However substantial advantages would accrue in terms of appearance and safety if the shoulder strap were made to retract to a stored position so it were out of general view within the vehicle when not in use. Appearance-wise, the spector of a number of straps hanging doubled within the vehicle is eliminated. Safety-wise, a successful retracting device would facilitate ready acceptance of shoulder harnesses by the general public.

In the following description, directional references such as forward, rearward, upward and downward are made with respect to an occupant of a motor vehicle while facing the forward direction of motion of the vehicle. "Inertia locking device" or "inertia lock" refers to a shoulder strap locking device which permits gradual extensions of the shoulder strap, but upon sudden extension thereof, as for example an extension due to a sudden impact of the vehicle, the shoulder strap is locked by the inertia lock against further extension. The capability to allow gradual extensions of the shoulder strap is desirable during normal operation of the vehicle, to permit the occupant to move forward as for example to adjust a control setting on the control panel, while he is using the shoulder strap as a restraining device.

In a safety seat belt restraint system, which includes a lap belt and a shoulder strap, the shoulder strap is generally pulled from a spring biased inertia retracting device and in one embodiment emerges from an opening above and to the rear of the occupant. The end of the shoulder strap has engaging means which facilitates connection to the lap belt or to other anchoring means. The retractor from which the shoulder strap is pulled is biased as to continually apply a force urging the shoulder strap to retract and move into the retractor. This bias serves to keep the shoulder strap taut during normal operation of the vehicle as well as to retract the shoulder strap when it is no longer required. When the shoulder strap is extended and is in the restraining position, the retracting force tends to pull the occupant back against the rear of the seat. This prolonged pull on the upper torso of the occupant has proven to be very tiring to the occupant in inertia retracting devices of the prior art.

In order to overcome this problem in the past in one embodiment, a clip-like gripping device is disposed on the shoulder strap and the occupant pulls the shoulder strap to the desired extended position and adjusts the gripping device to a selected position along the shoulder strap. The gripping device engages the entrance to the retracting device to prevent or limit retraction of the shoulder strap thereby relieving the biasing pressure of the inertia retracting device from the occupant.

This type of clip-like gripping device has certain disadvantages in that it requires manual adjustments to be made by the occupant to selected positions along the strap. The occupant must extend his arm in an overhead and rearward position toward the gripping device in order to position it along the shoulder strap to adjust the strap to a suitable length. This procedure does not insure quick and accurate shoulder strap adjustments and in many instances it must be repeated several times before the shoulder strap is properly set to the desired length.

Other attempts in the prior art to improve safety belt restraint systems and the retraction thereof have resulted in bulky and expensive enclosures which actually impair the appearance of the vehicle interior and which do not in fact facilitate the comfort and safety to the passengers for which they were originally intended. Still others have required the belt to be fully extended from its stored position when it is to form a part of the restraining system. In this type of retractor the user frequently finds that the belt is either too short or too long because of variations in the physical dimensions of the previous occupant of the seat. Thus the belt must be adjusted to the length desired by the user.

SUMMARY

The preferred embodiment of the present invention, which will be subsequently described in greater detail, is described with reference to a safety belt restraint system which utilizes a shoulder restraint belt which is extensible from a mounting attached above the occupant to provide an upper torso restraint for the occupant.

The preferred shoulder strap retracting system is normally attached to the roof of a vehicle slightly above and rearward of an occupant. The assembly includes two sub-assemblies, one of which is an inertia locking device and the other being a reel and housing enclosure assembly. A reel within the housing enclosure is rotatably urged by a suitable means, as for example a spring inserted therein, to wind a flexible element, as for example a cable, thereabout, the cable being attached to the shoulder strap and the spring being biased to urge the shoulder strap toward retraction. A clamping device, comprising a collet assembly having a spring therein, within the housing through which the cable extends, permits the cable to pass freely therethrough when it is compressed in an axial direction, but when the compression is removed, the spring biases the collet assembly to assume a clamping engagement with the cable. A collet seat is provided within the housing so as to transfer the retracting force from the cable to the housing when the collet assembly is in a clamping engagement with the cable and is positioned within the seat. This force transfer serves to relieve the occupant of the shoulder strap retracting force. A pivotally supported door within the housing has two alternate angular positions. In one position it compresses the collet assembly against the collet seat causing it to assume a non-clamping relationship with the cable. In the other position it disengages the collet assembly permitting the spring to extend it to a clamping engagement with the cable. When the vehicle occupant desires to be relieved of the shoulder strap retracting force he merely depresses a button within the housing. The button is connected by a latch member to permit the door to rotate as to relieve the compression of the collet assembly thereby permitting it to clamp the cable. The engagement of the collet assembly with the collet seat serves to transfer the retracting force from the cable through the seat to the housing, thus relieving the occupant of said force.

The other sub-assembly, namely the inertia locking device, permits the shoulder strap belt element to be extended gradually, but upon sudden extension thereof, the shoulder strap is locked against further extension by the locking device.

The desirability of an inertia retracting device, namely the combination of an inertia locking device and a reel and housing enclosure assembly as disclosed herein, is clear since it locks the belt in a fixed position only in response to high inertia forces thereon. The freedom of the vehicle occupant to move forward during normal operation of the vehicle is significant in terms of operating the vehicle and being capable to move forward at will.

The necessity of the continuous biasing force in inertia retractors of the prior art is also clear in view of the requirement to keep the belt element taut when used as a restraining device and also to provide a retracting force to retract the shoulder strap when it is no longer required. The instant invention retains the biasing retracting force where it is required, but the occupant is relieved of the necessity of continuously sustaining the uncomfortable retracting force.

It is therefore an object of this invention to provide a retracting system for shoulder restraint belts which system permits the occupant to move forward at will during normal operation of the motor vehicle while preventing shoulder strap retraction beyond a pre-selected length.

Another object of the present invention is to provide an apparatus for use with inertia-type shoulder harnesses, which apparatus facilitates quick and accurate shoulder strap length adjustments without requiring the occupant to assume uncomfortable positions to accomplish said adjustments.

Still another object of the present invention is to provide an apparatus for use with inertia responsive shoulder harnesses, which apparatus facilitates satisfactory shoulder strap retraction to a stored position when the shoulder strap is no longer required.

DESCRIPTION OF THE DRAWINGS

The description refers to the accompanying drawings in which like reference characters refer to like parts throughout the several views and in which:

FIG. 1 is a perspective view of a shoulder strap extended from an overhead retracting device illustrating the preferred embodiment of the invention;

FIG. 2 is a plan view of the preferred retracting device separated from the vehicle; and FIG. 3 is a sectional view of the retracting device of FIG. 2 with the safety belt element broken away for the purpose of description.

DESCRIPTION OF THE PREFERRED EMBODIMENT

Referring to FIG. 3 the preferred retracting device which is preferably intended for, but not limited to, the retraction of shoulder straps, includes two sub-assemblies, one of which is an inertia responsive locking device generally indicated at 10. The device 10 engages and locks the shoulder strap 26 to prevent sudden extension in response to a rapid extension or high inertia force being applied to the shoulder strap, as for example, when the vehicle undergoes a collision and the occupant's inertia causes him to move forwardly while restrained by the shoulder strap. For the purposes of the instant description, it may be indicated that the shoulder strap passes through an inertia responsive device or through merely rollers and the like.

The instant invention therefore relates specifically to the reel assembly generally shown at 12 to the left of FIG. 3. The assembly 12 includes a housing 14 which has attached thereto a bottom plate or cover 16. A reel 18 is rotatably supported in the housing 14 and has a flexible element, as for example, a cable 20 wound thereabout. A spring 22, for example, urges the reel 18 to rotate so as to wind the cable 20 thereabout. The cable 20 is attached at 24 to the shoulder strap belt element 26. The shoulder strap 26 passes through the inertia responsive locking device 10 and back to a flat shoulder strap tongue 28. The shoulder strap tongue 28 supports a cylindrical pin 30 which is adapted to engage a lap belt buckle where it is preferred to anchor the end of the shoulder strap 26 to a lap belt for example, when the shoulder strap is used as an upper torso restraining device. Other anchoring means may be used in the vehicle to accept the tongue 28 to anchor the shoulder strap. A clip 32 is provided to retain the tongue 28 in position when it is inserted into the housing 14 and the pin 30 is inserted into the clip 32. The clip 32 is comprised of at least two sections resembling isosceles trapezoids wherein the smaller parallel sides thereof have concave curvatures to complement the cylindrical surface of the pin. The clip sections, which are preferably fabricated of a resilient molded synthetic resinous material, as for example nylon, polyester and the like, are separated and oriented so that the concave edges form portions of the circumference of a circle having a diameter slightly less than the pin diameter as to facilitate clamping engagement with the pin when it is inserted therebetween.

A button 34 is movably supported by the housing 14 and is secured to an "L" shaped latch member 36 which is biased away from the cover 16 by the bow spring 38. A door 40 is pivotably connected to the housing at 42 and engages the latch member 36 at its lower end. A collet assembly 44 is disposed about the cable 20 and positioned in a collet seat 48. The collet assembly 44 is biased by a spring 46, which reacts between the components of the collet assembly 44, thereby extending it to a clamping engagement with the cable 20. When the collet assembly 44, hereinafter referred to simply as a collet 44, is compressed in an axial direction, it permits the cable to pass freely therethrough. When the door 40 is pivoted toward the cover 16 it compresses the collet 44, causing it to permit the cable to pass therethrough freely. This rotational motion of the door 40 is achieved by the engagement of the tongue 28 with the door 40 when the tongue 28 is inserted into the housing 14 and the pin 30 is inserted into the clip 32 when the use of the shoulder strap 26 is no longer required. The door 40 is held in the collet compressing position by engagement with the spring biased latch member 36 at its lowest end. When the tongue 28 is thus inserted into the housing 14 and rotates the door 40 thereby compressing the collet 44 the cable is then free to pass through the collet 44. The spring 22, which continuously urges the reel 18 to rotate so as to wind the cable thereabout, then causes the shoulder strap 26 to retract to a stored position along the roof or headliner of the vehicle, for example. The stored shoulder strap 26 is positioned neatly between the reel assembly 12 and the inertia lock 10 in separate parallel sections as is illustrated for example in FIG. 3.

When the assembly 12 is in the position illustrated in FIG. 3, the collet 44 is in non-clamping relationship with the cable 20 so that the biasing of the spring 22 through reel 18 urges a retraction of the shoulder strap 26. While in this position, the tongue 28 may be removed and attached to a lap belt or other anchoring means provided in the vehicle. As the shoulder strap 26 and the collet 44 are in the position illustrated, the shoulder strap 26 will always be urged in a retracting direction so as to apply a force to the occupant. If the occupant desires to release this retracting force at a selected position, he depresses the button 34 to move the latch member 36 toward the cover 16 to disengage the door 40 whereby the compression of the collet is relieved and the collet spring 46 extends the collet 44 into clamping engagement with the cable 20. The door 40 pivots away from the cover 16 by virtue of the action of the spring 46. As the collet 44 is clamped about the cable 20, the biasing force applied as a result of the spring 22 is relieved and transmitted to the collet seat 48, unless the occupant moves outwardly to further extend the shoulder strap 26 to move the collet 44 out of the housing 14. The force will again be relieved, however, when the occupant moves backward to allow the collet 44 to re-enter the housing 14 and re-engage the collet seat 48 as it is in clamping engagement with the cable 20.

Thus the occupant may select the desired shoulder strap length and relieve the biasing retracting force by merely depressing the button 34 or he may choose to sustain it while using the shoulder strap as a restraining device. The occupant may move forward at will during normal operation of the vehicle, but upon sudden impact the shoulder strap is locked against further extension by the inertia locking device 10 and the occupant is restrained from the sudden forward motion which would otherwise be caused by the inertial forces during a collision of the vehicle. When the occupant moves forward slowly the collet 44 moves away from the collet seat 48 and the retracting force of the spring 22 is again transmitted through the shoulder strap 26 to the occupant.

Although I have disclosed but one preferred embodiment of the present invention, it will be obvious to one skilled in the art that many changes and modifications may be made therein without departing from the spirit of the invention.

What is claimed is:

1. In a safety seat belt assembly mounted in a vehicle, the combination comprising:
   a. a housing enclosure;
   b. a flexible element within said housing enclosure and emerging therefrom;
   c. resilient means to urge said element to retract into said housing enclosure;
   d. a flexible belt element having one end connected to said first mentioned element, an opposite end having means to anchor said belt element to the vehicle, and an intermediate section for extension thereof over a vehicle occupant's body to prevent sudden forward motion of the occupant upon collision of the vehicle;
   e. clamping means to releasably clamp said first mentioned flexible element within said housing enclosure;
   f. means within said housing enclosure to engage said clamping means while said first mentioned flexible element is clamped therein to prevent further retraction of said element beyond a preselected clamped location;
   g. means within said housing to retain the anchoring end of said belt element when it is inserted into said housing; and
   h. an inertia locking means through which said belt element passes to prevent sudden extension of said belt element in response to a high inertia force being applied thereto.

2. The invention as defined in claim 1 wherein said means to urge said first mentioned element to retract within said housing enclosure comprises:
   a. a circular reel assembly rotatably supported within said housing enclosure; and
   b. a spring which urges said reel assembly to rotate so as to wind said element thereabout.

3. The invention as defined in claim 2 wherein said means to anchor said belt element to the vehicle comprises a flat tongue section and a pin supported by said tongue section.

4. The invention as defined in claim 3 wherein said pin is cylindrical and said means within said housing enclosure to retain the anchoring end of said belt element when it is inserted into said housing comprises a clip fabricated of a resilient material, said clip having at least two sections substantially resembling isosceles trapezoids wherein the smaller parallel sides have concave curvatures to substantially complement the surface of said cylindrical pin, said sections being oriented and separated so that the concave sides form portions of the circumference of a circle having a diameter slightly less than said pin diameter to facilitate clamping engagement of said sides with said pin when said pin is inserted between said clip sections.

5. The invention as defined in claim 4 wherein said resilient material is a molded synthetic resin.

6. The invention as defined in claim 5 wherein said molded synthetic resin is nylon.

7. The invention as defined in claim 6 wherein said means to releasably clamp said first mentioned element comprises:
   a. a collet assembly disposed about said element within said housing enclosure, said collet assembly being adapted to permit said element to pass freely therethrough when compressed axially and said collet assembly being adapted to clamp said element when uncompressed and extended axially;
   b. a spring between the components of said collet assembly, said spring being adapted to bias said collet assembly to an extended configuration to a clamping engagement with said element;
   c. means within said housing enclosure to compress said collet assembly axially to release the clamp of said collet assembly on said element, said compression causing said collet spring to be compressed and react against said compressing means; and
   d. means within said housing enclosure to release the compression on said collet assembly to permit said collet assembly to clamp said element.

8. The invention as defined in claim 7 wherein said means within said housing enclosure to compress said collet assembly axially comprises:
   a. a latch member movably supported within said housing enclosure; and
   b. a door pivotally connected to said housing enclosure said door being adapted within said housing enclosure to rotate toward said collet assembly when said tongue is inserted into said housing enclosure and engages said door, said rotated door engaging and compressing said collet assembly, said door being held in the collet compressing position by engagement with said latch member.

9. The invention as defined in claim 8 wherein said means to engage said collet assembly while said first mentioned element is clamped therein comprises a seat for said collet assembly, said seat being affixed within said housing enclosure, said seat being shaped to engage and accept said collet assembly to prevent further retraction of said element beyond a preselected location on said element.

10. The invention as defined in claim 9 wherein said housing enclosure comprises an upper section and a bottom cover plate.

11. The invention as defined in claim 10 wherein said first mentioned flexible element comprises a cable.

12. In a safety seat belt assembly mounted in a motor vehicle, the combination comprising:
   a. a housing enclosure having an upper section and a bottom cover plate;
   b. a circular reel assembly rotatably supported within said housing enclosure;
   c. a cable attached to said reel assembly so as to permit said cable to wind about said reel assembly;
   d. a circular spring within said reel assembly which urges said reel assembly to rotate so as to wind said cable thereabout;
   e. a shoulder strap comprising a flexible belt element, said strap having one end connected to said cable, an opposite end having a flat tongue section and a cylindrical pin supported by the tongue section, the pin being adapted to engage a buckle assembly in a lap belt to anchor said shoulder strap to the vehicle, and an intermediate section for extension thereof over a vehicle occupant's body for restraining the occupant against sudden impact;
   f. a clip within said housing enclosure to retain the tongue section when inserted therein, said clip having at least two sections fabricated of a resilient molded synthetic resinous material, which sections are shaped to substantially resemble isosceles trapezoids wherein the smaller parallel sides have concave curvatures to substantially complement the surface of said cylindrical pin, said sections being oriented and separated so that the concave sides comprise portions of a circle having a diameter slightly less than said pin diameter to facilitate clamping engagement of said edges with said pin when said pin is inserted between said clip sections;
   g. an inertia locking means through which said belt element passes prevent sudden extension of said belt element in response to a rapid extension being applied to said shoulder strap;
   h. a button movably supported within said housing enclosure;
   i. a latch member having an upper end secured to said button and an L shaped lower end extending toward the bottom cover plate of said housing enclosure;
   j. a bow spring mounted between said housing enclosure bottom cover plate and the lower end of said latch member, said spring being adapted to bias said latch member and said button away from the bottom cover plate of said housing enclosure;
   k. a collet assembly disposed about said cable within said housing enclosure, said collet assembly being adapted to permit said cable to pass freely therethrough when compressed axially and said collet assembly being adapted to clamp said cable when uncompressed and extended axially;
   l. a spring between the components of said collet assembly, said spring being adapted to bias said collet assembly to an extended configuration to a clamping engagement with said cable;

m. a door pivotally connected to said housing enclosure, said door being adapted to rotate toward said collet assembly to compress said collet assembly when said tongue is inserted into said housing enclosure and engages said door, said compressed collet assembly permitting said cable to pass freely therethrough, said door being held in the collet compressing position by engagement with said bow spring biased latch member at the lowest end of said latch member, said door also being adapted to rotate away from said collet assembly when said button is depressed causing said latch member to move toward said housing enclosure bottom cover plate thereby releasing said door permitting said collet assembly biasing spring to extend said collet assembly to a clamping engagement with said cable; and n. a seat within said housing enclosure for said collet assembly, said seat having a configuration to accept and retain said collet assembly in engagement therewith to prevent further retraction of said cable while said collet assembly is clamped thereabout, said seat also permitting egress of said collet assembly when occupant moves forward and said shoulder strap moves said cable forward therewith.

* * * * *